United States Patent [19]

Lee et al.

[11] Patent Number: 5,061,046
[45] Date of Patent: Oct. 29, 1991

[54] GRADIENT INDEX LIQUID CRYSTAL DEVICES AND METHOD OF FABRICATION THEREOF

[75] Inventors: Jae-Cheul Lee, Rochester; Stephen Jacobs, Pittsford, both of N.Y.

[73] Assignee: The University of Rochester, Rochester, N.Y.

[21] Appl. No.: 452,886

[22] Filed: Dec. 19, 1989

[51] Int. Cl.$^5$ .............................................. G02F 1/13
[52] U.S. Cl. ...................................... 359/53; 359/93; 359/101; 359/102
[58] Field of Search ........... 350/350 R, 347 E, 347 R, 350/347 V, 335, 350, 349, 350 S; 299/D1, 1

[56] References Cited

U.S. PATENT DOCUMENTS

| | | | |
|---|---|---|---|
| 4,108,621 | 8/1978 | Asahara | 65/30 R |
| 4,650,600 | 3/1987 | Heppke et al. | 350/350 R |
| 4,679,911 | 7/1987 | Jacobs et al. | 350/347 E |
| 4,780,241 | 10/1988 | Furukawa et al. | 350/350 S |
| 4,886,619 | 12/1989 | Janulis | 350/350 S |
| 4,919,520 | 4/1990 | Okada et al. | 350/347 R |

FOREIGN PATENT DOCUMENTS

| | | | |
|---|---|---|---|
| 0203916 | 10/1985 | Japan | 350/334 |
| 0013019 | 1/1988 | Japan | 350/334 |
| 2169617 | 7/1986 | United Kingdom | 350/334 |

OTHER PUBLICATIONS

V. R. Costich and B. C. Johnson, "Apertures to Shape High Power Beams", Laser Focus, 10(9), 43-46 (1974).
A. Penzkofer and W. Frohlich, "Apodizing of Intense Laser Beams with Saturable Dyes," Opt. Commun. 28(2), 197-201 (1979).
G. Dubé, "Progress in Glass Components for Neodymium Lasers," in *Advanced Laser Technology and Applications*, L. Esterowitz, ed., Proc. Soc. Photo-Opt. Instrum. Eng. 335, 10-14 (1982).
V. I. Kryzhanovskii, B. M. Sedov, V. A. Serebryakov, A. D. Tsvetkov, and V. E. Yashin, "Formation of the Spatial Structure of Radiation in Solid-State Laser Systems by Apodizing and Hart Apertures," Sov. J. Quantum Electron. 13(2), 194-198 (1983).
A. J. Campillo, B. Carpenter, B. E. Newnam, and S. L. Shapiro, "Soft Apertures for Reducing Damage in High-Power Laser-Amplifier System," Opt. Commun. 10(4), 313-315 (1974).
E. W. S. Hee, "Fabrication of Apodized Apertures for Laser Beam Attenuation," Opt. Laser Technol. 7(2), 75-79 (1975).
S. B. Arifzhanov, R. A. Ganeev, A. A. Gulamov, V. I. Redkorechev, and T. Usmanov, "Formation of a Beam of High Optical Quality in a Multistage Neodymium Laser," Sov. J. Quantum Electron. 11(6), 745-749 (1981).
G. Dubé, "Total Internal Reflection Apodizers," Opt. Commun. 12(3), 344-347 (1974).
J. C. Diels, "Apodized Aperture Using Frustrated Total reflection," Appl. Opt. 14(12), 2810-2811 (1975).
B. J. Feldmand and S. J. Gitomer, "Annular Lens Soft Aperture for High Power Laser Systems," Appl. Opt. 16(6), 1484-1486 (1977).
S. D. Jacobs, K. A. Cerqua, K. L. Marshall, A. Schmid, M. J. Guardalben, and K. J. Skerett, "Liquid-Crystal Laser Optics: Design, Fabrication, and Performance," J. Opt. Soc. Am. B 5(9), 1962-1979 (1988).

(List continued on next page.)

*Primary Examiner*—Rolf Hille
*Assistant Examiner*—Tan Ho
*Attorney, Agent, or Firm*—Martin LuKacher

[57] ABSTRACT

Laser beam apodizers using cholesteric liquid crystals provides soft edge profile by use of two separate cholesteric liquid crystal mixtures with different selective reflection bands which in an overlap region have a gradient index where reflectivity changes as a function of position. The apodizers can be configured as a one-dimensional beam apodizer with a clear aperture which can be mechanically adjusted by slididng two complimentary devices relative to each other, and as a circular beam apodizer.

23 Claims, 11 Drawing Sheets

OTHER PUBLICATIONS

J. L. Fergason, "Cholesteric Structure I. Optical Properties," in *Liquid Crystals: Proceedings of the International Conference on Liquid Crystals,* at Kent State University, Aug. 16–20, 1965.

G. H. Brown, G. J. Dienes, and M. M. Labes, eds., pp. 89–103, Gordon and Breach, New York (1967).

J. C. Lee, J. H. Kelly, D. L. Smith, and S. D. Jacobs, "Gain Squaring in a Cr:Nd:GSGG Active–Mirror Amplifier Using a Cholesteric Liquid Crystal Mirror," IEEE J. Quantum Electron. 24(11), 2238–2242 (1988).

P. D. deGennes, *The Physics of Liquid Crystals,* pp. 264–266, Oxford, Claredon (1974).

Ibid, pp. 240–241.

F. Leenhouts, S. Kelly, and A Villiger, "Compensation of Temperature Dependence of the Optical Characteristics of Twisted Nematic Liquid–Crystal Displays Using a Single Chiral Dopant," Appl. Phys. Lett. 54(8), 696–697 (1989).

H. Kelker in "Molecular Crystals and Liquid Crystals," vol. 15, pp. 347–361; Gordon & Breach Science Publishers, Great Britain, 1972.

GRADIENT INDEX LIQUID CRYSTAL DEVICES AND METHOD OF FABRICATION THEREOF

INTRODUCTION

The U.S. government has rights in the invention under Contract No. DE-FC03-85DP40200 between the University of Rochester and the Department of Energy.

The present invention relates to optical apparatus, and particularly to apparatus using liquid crystals which provide gradient index optical effects for shaping the spatial intensity profile of optical beams having designated wavelengths, and to methods of fabricating same.

BACKGROUND

Laser beam apodization has been a goal of solid state laser programs since the early 1970s. Apodization is the shaping of the spatial beam profile to increase the fill factor through the gain medium. This allows more energy to be extracted from the gain medium and also reduces linear and nonlinear edge diffraction effects which cause self-focusing spikes. A beam apodizer determines, to a large extent, the ultimate performance of a high power laser system.

Several techniques for apodizing laser beams have been reported. See references (1) to (11) listed below. Apodizers based upon absorption are disadvantageous, since the refractive index of the absorbing medium (usually glass or thin films) is changed. The change of refractive index prevents preservation of uniform wavefront quality and can cause Fresnel diffraction effects. Apodization by selective reflection (a distributed Bragg effect) of cholesteric liquid crystals does not give rise to absorption as in absorbing media. Recently, S. D. Jacobs et al. have developed a new apodizer based on liquid crystal technology that has demonstrated properties resembling those of a perfect apodizer. See reference (12) and Jacobs et al. U.S. Pat. No. 4,679,911. The Jacobs et al. apodizer works best for small clear apertures, e.g. up to about 8 mm., and in some embodiments requires grinding of precise flat surfaces of optical elements, which makes fabrication difficult.

It is a feature of the invention to provide a laser beam apodizer utilizing liquid crystals which can be used for beam apodization of an oblong (in cross-section) beam, especially suitable for use with slab-geometry laser amplifiers or diode lasers, and also for beam apodization of circular beams, especially useful with rod laser amplifiers with large (e.g., 10 mm or more) clear apertures.

The invention is especially suitable for use in providing a soft aperture for shaping the intensity of laser beams utilizing the properties of cholesteric liquid crystals (CLC). The term "liquid crystals" as used herein includes crystals both in the solid and fluid state. The term "cholesteric" is used generically to mean liquid crystals which have chirality, whether pure cholesteric compounds or nematic materials mixed with chiral additives.

Figure 1:
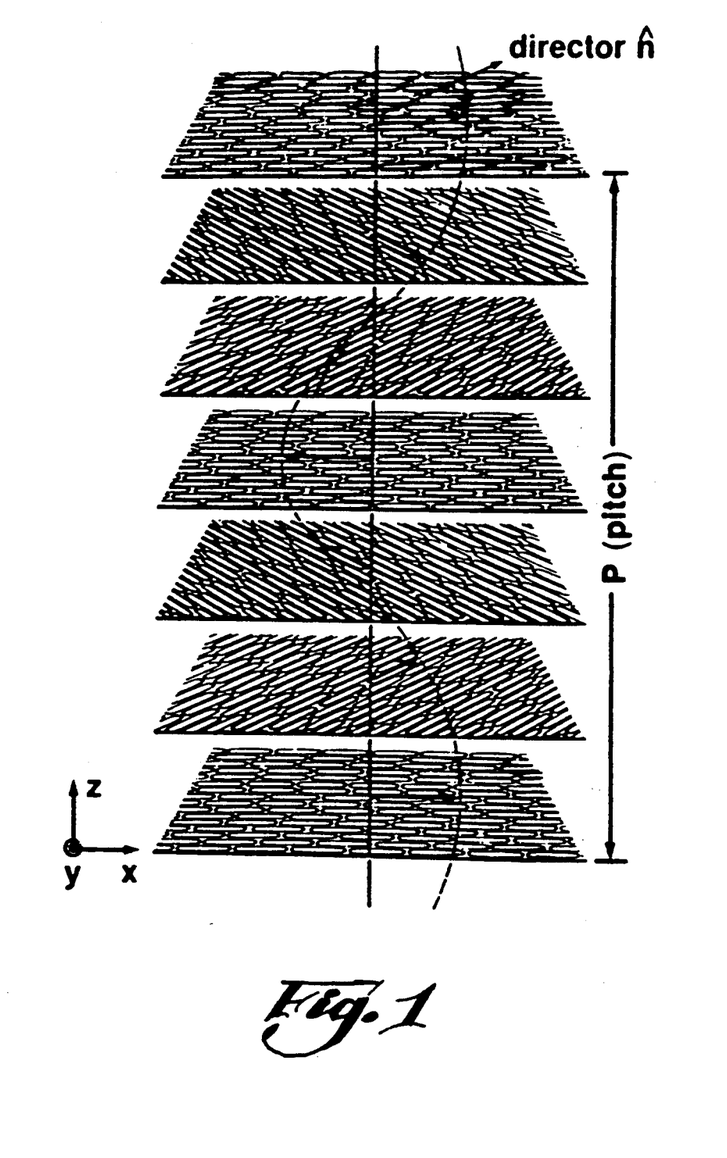
FIG. 1 is a schematic diagram of molecular order in a cholesteric liquid crystal.

CLCs have a helical layered organization as shown in FIG. 1. Normally, a CLC cell is prepared between two glass substrates. Within each single layer of the structure, molecules align in a parallel configuration like nematics. The average orientation of the elongated liquid crystal molecules is defined as the director. In adjacent layers, protruding side groups of atoms attached to each molecule and force the director to be twisted. The rotation of layers through the fluid gives rise to a helical structure. One full 360° rotation of the director is defined as one pitch length $P_o$. This helical structure leads to the important optical properties of selective reflection in circular polarization and wavelength. See reference (13).

Consider a right-handed CLC cell shown in FIG. 1 whose helical axis is oriented along the z-axis. No interaction occurs between the right-handed helical structure of the CLC and left circularly polarized light propagating through it. However, when right circularly polarized light with wavelength $\lambda$ propagates along the z-axis at normal incidence, the reflectivity R is given by $$R = \frac{\sinh^2 \kappa L \sqrt{1 - [\delta/\kappa]^2}}{\cosh^2 \kappa L \sqrt{1 - [\delta/\kappa]^2} - [\delta/\kappa]^2} \qquad (1)$$

where $$\kappa = \kappa_0 \cdot \frac{\lambda_0}{\lambda} \text{ and } \kappa_0 = \frac{\pi}{\lambda_0} \cdot \Delta n$$

is the coupling coefficient;

$$\delta = 2\pi \left( \frac{1}{\lambda} \cdot \frac{1}{\lambda_0} \right) n_{av}$$

is the detuning parameter; $\lambda_o = n_{av} \cdot P_o$ is the peak wavelength of the selective reflection band; and L is the CLC fluid thickness. See reference (14). $\Delta n = (n_e - n_o)$ and $n_{av} = (n_e + n_o)/2$ represent the optical birefringence and average refractive index, respectively. When $\lambda = \lambda_o$, the CLC structure is well phase-matched to the input wavelength, and the reflectivity is equal to $$R = \tanh^2(\kappa_o L). \qquad (2)$$

It has been reported see reference (1)) that an ideal beam apodizer possesses the following characteristics:

1. The slope of the transmission function between 90% and 10% transmission points is at least 3 $\lambda L/D$, where $\lambda$ is the laser wavelength, L is the propagation distance over which intensity modulation should be minimal, and D is the beam diameter. One of the transmission functions which approximates this condition is a super-Gaussian of order N, that is, $$T(r) = \exp[-(r/r_o)^N] \qquad (3)$$

where the radial clear aperture $r_o$ is selected based on the condition that $T(r_1) = 10^{-3}$, where $2r_1$ is the entry aperture of the optical device (e.g. a laser amplifier) that follows the apodizer. Transmission is Gaussian where $N = 2$.

2. Wave front quality over the clear aperture and into the soft edge is a smooth function with continuous first derivatives.

3. The peak to minimum transmission ratio is at least 1000 to 1.

4. High laser damage threshold at the design wavelength and pulse width.

5. Environmental stability.

SUMMARY OF THE INVENTION

It is a feature of the invention to use CLCs which are a blend of nematic liquid crystals and chiral additive materials wherein the selective reflection peak wavelength is tuned by changing the blending ratio (or relative concentration) of these materials. In blending, adding more nematic liquid crystal increases the pitch length $P_o$ and adding more chiral additive decreases $P_o$. Gradient index optical effects which provide a soft aperture are produced in a region where CLCs having different $P_o$ overlap, (the overlap region—OLR) thereby making it possible to shape or apodize laser beam.

DESCRIPTION OF THE DRAWING FIGURES

FIG. 6 (a) shows schematically, apparatus used to measure transmission profiles of apodizer devices provided by the invention.

FIG. 6 (b) are curves showing transmission profiles for three gradient GCLC elements as a function of position after annealing periods of 1 hr., 2 hr. and 4 hr. in the isotropic phase.

DETAILED DESCRIPTION

Figure 2:
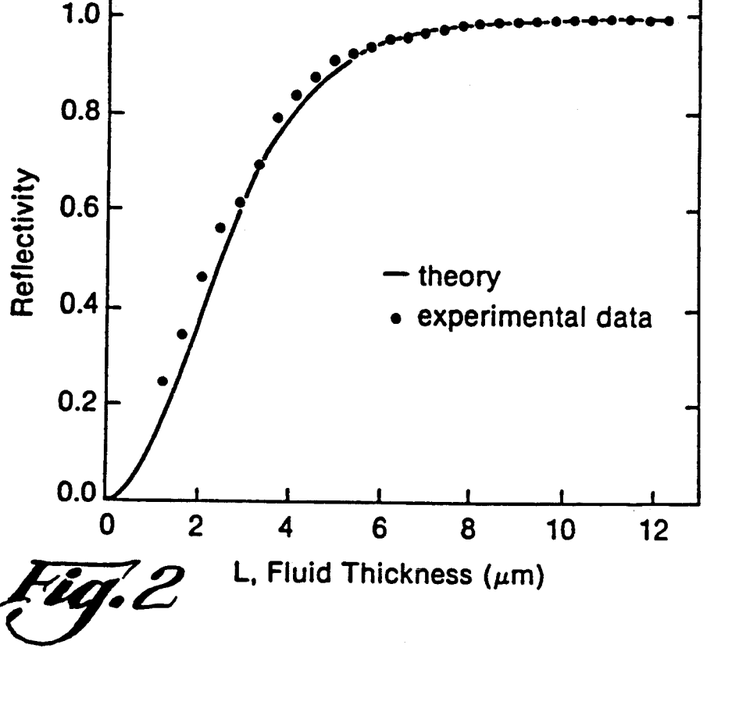
FIG. 2 is a curve of reflectivity R measured at $\lambda = 1064$ nm, as a function of thickness L, for a CLC blend or mixture of E7 and CB15 tuned to exhibit a selective peak at $\lambda_o = 1064$ nm. The blend has a coupling coefficient $K_o = 0.5439$. The solid line curve represents the results of theoretical calculation, and the circles represent experimental data.

The devices provided by the invention use mixtures or blends of nematic liquid crystal materials and chiral additives, the chemistry of which and the sources thereof are described in the above referenced Jacobs et al. article and patent. Further description of the chemistry is provided in manufacturers product literature and are well known in the art. As an example, the blend of a nematic liquid crystal E7 and chiral additive CB15 can be tuned to exhibit a selective reflection peak at $\lambda = 1064$ nm. These liquid crystal materials are available from EM Chemicals, Hawthorne, N.Y. U.S.A. For the CLC fluid prepared by blending them in their isotropic states, E7 was 21.36% by weight and CB15 was 78.64% by weight, $n_{o,n} = 1.4172$, $n_{e,n} = 1.6014$, $\Delta n = 0.1842$ and $n_{av} = 1.5093$ as determined with an Abbé refractometer (22° C., $\lambda = 1053$ nm). At $\lambda = 1064$ nm, the coupling coefficient is calculated to be K = 0.5439. For this CLC blend, the reflectivity as a function of thickness is shown in FIG. 2. The close match of theoretical and experimental data supports the validity of Eq. (3).

Figure 3:
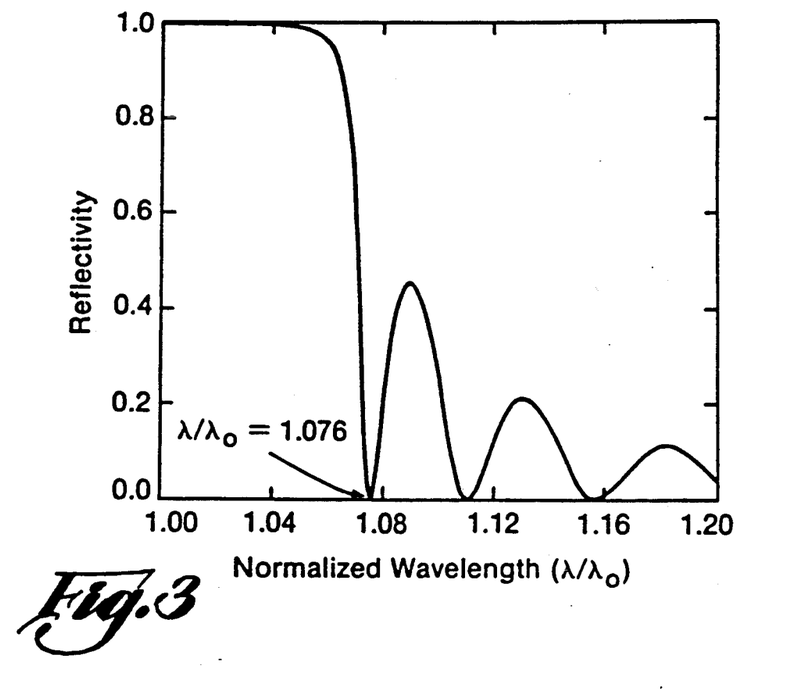
FIG. 3 is a curve of reflectivity R for the same CLC mixture as in FIG. 2, as a function of normalized wavelength $\lambda/\lambda_o$ for KL = 4.59.

A plot of the reflectivity R as a function of $\lambda/\lambda_o$ for KL = 4.59 is shown in FIG. 3. It can be seen that when $\lambda/\lambda_o = 1.076$, the reflectivity of the CLC goes to zero. The ripples in FIG. 3 are due to phase mismatching. In making the elements described hereinafter, all are assembled having substrates (separating the CLC material) with weak surface anchoring. Such anchoring prevents disinclinations which cause diffraction effects and prevent the creation of smooth gradients. See reference (19) for a discussion of disinclinations. This weak surface anchoring is very important for the apodizers of this invention because it prevents any discontinuity in structure and concomitant deviations from a smooth reflectivity profile. See also reference (15). Weak anchoring is obtained by substrate surface preparation (an example is discussed below) before assembly to avoid lines or grooves by which the CLC molecules can orient relative to the substrate surface. An exemplary technique for insuring weak anchoring is as follows: substrates are cleaned by rubbing with deagglomerated alumina (for example, Gamma Micropolish II, Buehler) and by ultrasonic cleaning for 2–3 minutes, followed by through rinsing with deionized water. Once clean, substrates are blown dry with filtered nitrogen, and treated with an antistat gun to remove static charge. The substrates are separated by mylar spacers to define the thickness of the fluid. Then cholesteric liquid crystal is filled by capillary action. Grandjean alignment is obtained by shearing techniques, i.e., moving the substrates laterally a few mm with respect to each other at room temperature.

Figure 4:
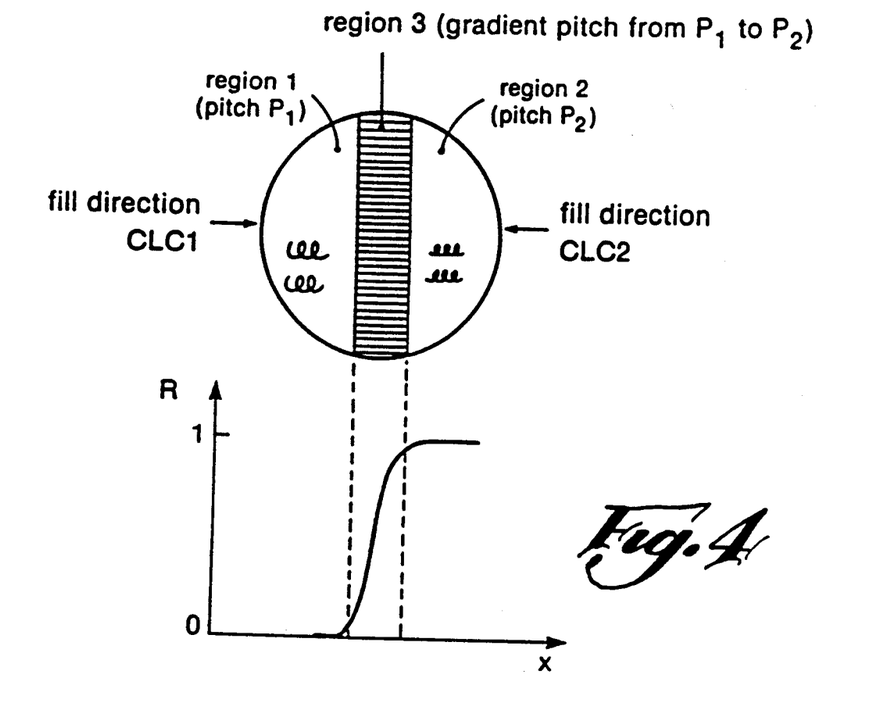
FIG. 4 is a schematic diagram of a gradient index cholesteric liquid crystal element (GCLC) having two CLCs, CLC1 and CLC2 and the reflectivity profile of a gradient cholesteric liquid crystal element. The region where CLC1 and CLC2 overlap and mix to create a pitch gradient results in the illustrated smoothly varying reflectivity profile as shown by the horizontal hatching.

A spatial gradient in selective reflection peak wavelength can be induced by filling a cell device with mixtures of two CLC fluids, CLC1 and CLC2 having different selective reflection bands as a result of different percentages (relative concentrations) of a chiral additive in each blend, from opposite sides of a cell as shown in FIG. 4. The fluid-like property of liquid crystals allows them to blend together in an overlap region 3. The device is shown schematically in FIG. 4 and will be referred to as a gradient CLC (GCLC) device or element. The blending ratio (relative concentration) of chiral additives in the nematic liquid crystal host varies linearly in region 3 from the Region 1 side to the region 2 side. Since the helix wave number, $q_o$, of the CLC, $q_o = 2\pi/P_o$, is proportional to the concentration see reference (16), $\delta/\kappa$ in Eq. (1) can be rewritten as $$\frac{\delta}{\kappa}(x) = \frac{2n_{av}}{\Delta n}\left(1 - \frac{q_0(x)}{k_0}\right) \quad (4)$$

$$= \frac{2n_{av}}{\Delta n}\left(1 - \frac{\lambda_0}{\lambda}\right)$$

where $$k_0 = \frac{2\pi}{\lambda} \cdot n_{av}$$

is the wave number in the liquid crystal medium. For simplicity, the average refractive index and birefringence are assumed to be constant in the wavelength regions of interest. Then $\lambda/\lambda_o$ changes linearly as a function of position. If two CLCs are chosen such that CLC2 has a normalized wavelength which gives rise to high reflectivity and CLC1 has $\lambda/\lambda_o = 1.076$, a smooth edge profile can be created in the overlap region as shown in the reflectivity curve of FIG. 4. Assuming that the width of the overlap region is held constant, the slope of the transmission function across the overlap region can be varied by tuning the $\lambda/\lambda_o$ of CLC2 used for high reflection in region 2 of FIG. 4. As the $\lambda/\lambda_o$ in region 2 approaches 1.076, the slope across the overlap region (region 3) is reduced, resulting in a softer reflectivity edge profile for the device.

There are several ways to create shaped gradients in $\Delta n$ and $n_{av}$: (1) by using the same host nematic with different concentrations of the same chiral additive resulting in two distinctly different selective reflection bands with similar $\Delta n$ as discussed above; (2) by using different host nematics (allowing for variability in viscosity and birefringence) with the same chiral additive; and (3) by using different host nematics with different chiral additives. It is also important that the refractive indices of the substrates be substantially matched to the average refractive indices of the CLC materials, where preservation of wavefront quality is of interest.

Figure 5:
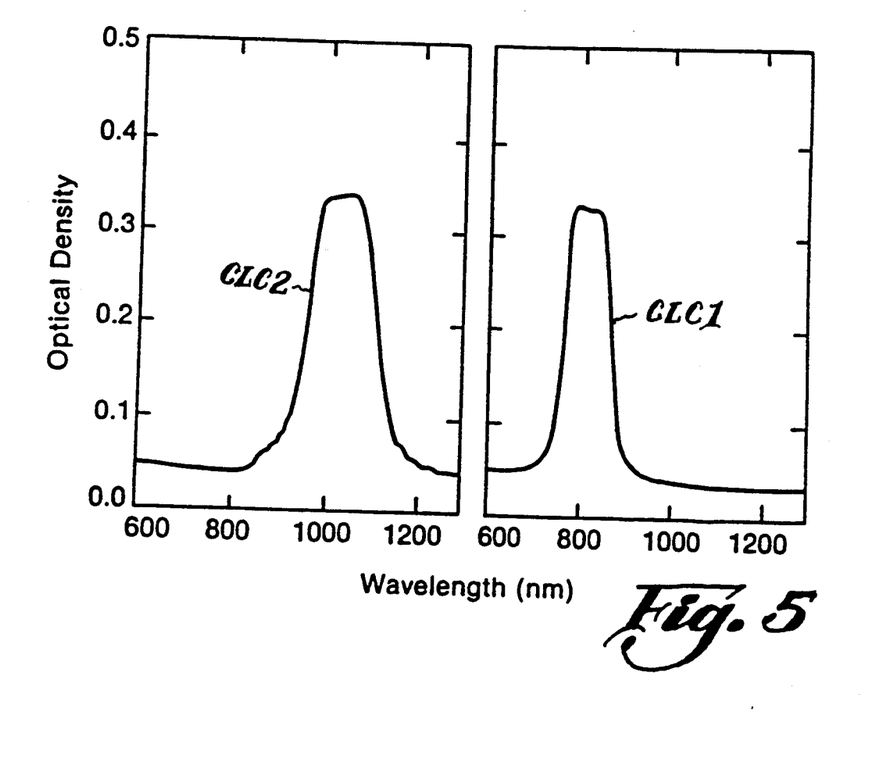
FIG. 5 are curves showing individual selective reflection bands for the two different cholesteric liquid crystals used in fabricating the GCLC elements.
Figure 6A:
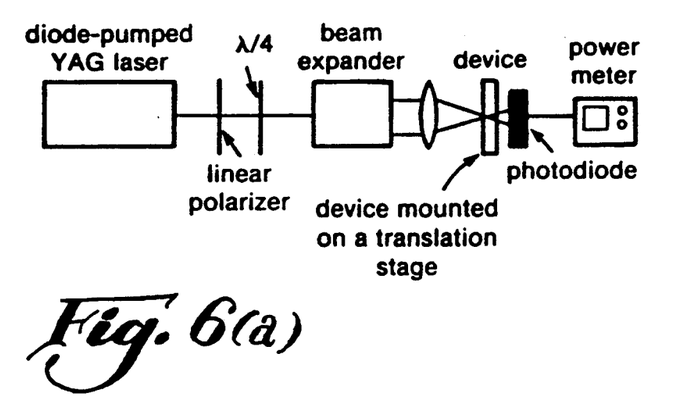
Figure 6B:
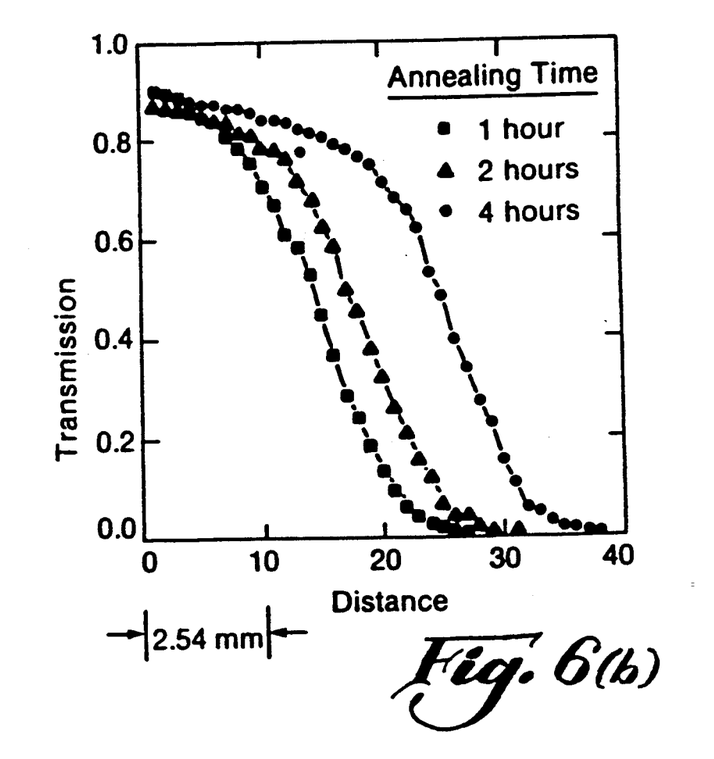
Figure 7:
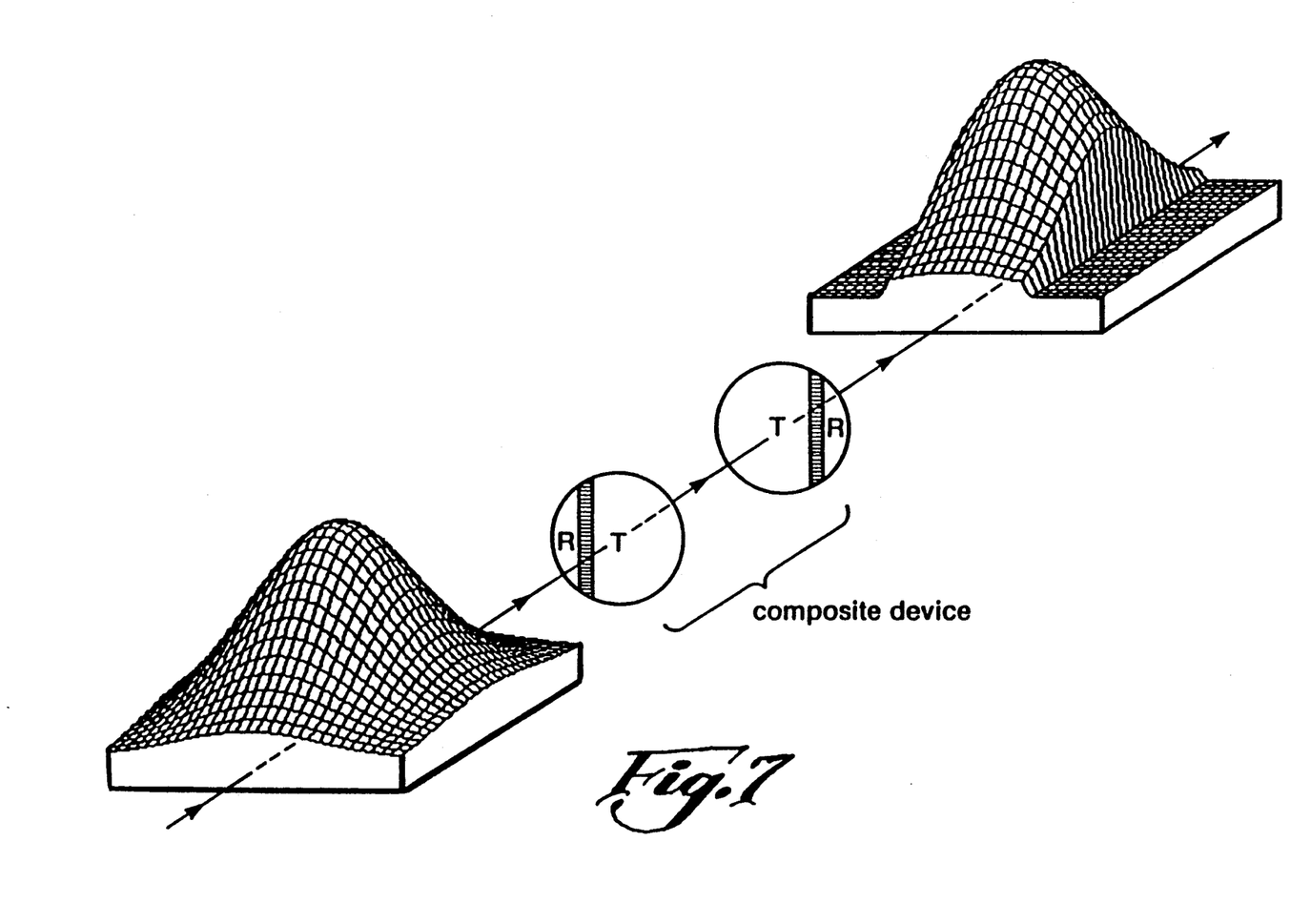
FIG. 7 is a schematic perspective view of a one dimensional beam apodizer having a stacked pair of two complimentary GCLC elements, and the profiles of the incident beam and apodized beams exiting the apodizer. A variation in lateral position of the elements relative to each other allows for the adjustment of the clear aperture. In this illustration, R represents reflection of the incident beam, and T represents transmission. The shaded area represents the mixing or overlap region in each element where a pitch gradient and gradient index exist.
Figure 8:
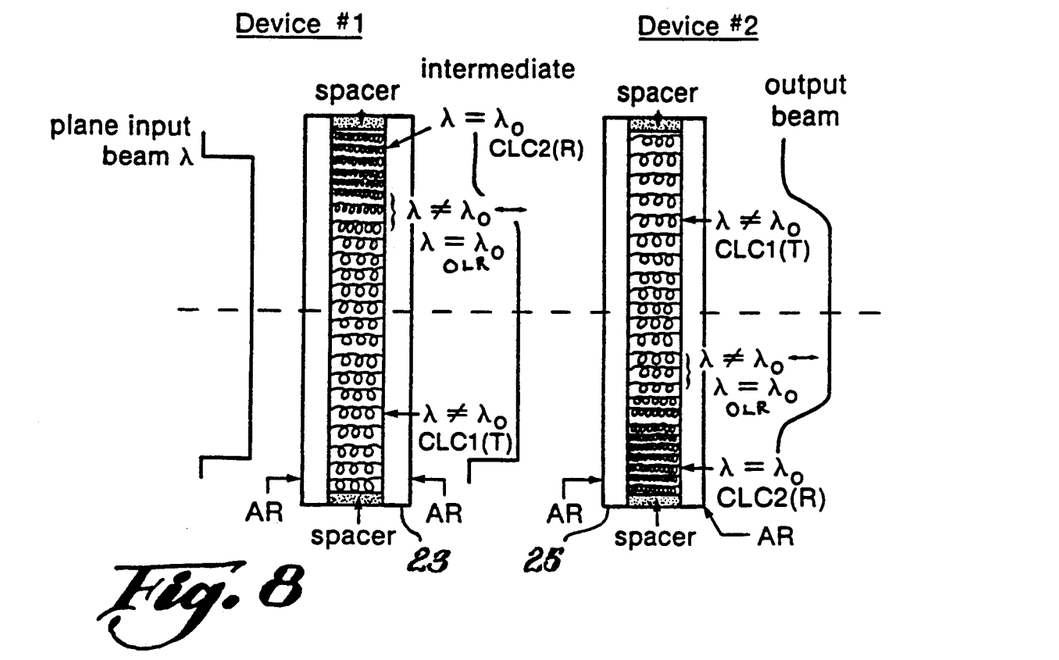
FIG. 8 is a schematic, elevational view in cross-section showing the apodizer of FIG. 7 in greater detail. The tightness of the helices schematically indicates the pitch of the CLCs. Tightly twisted regions correspond to short pitch; loosely twisted regions correspond to long pitch; and regions of intermediate twist correspond to the fluid overlap region, OLR, where a spatial gradient in pitch exists.

Referring to FIGS. 5–9, it will become more apparent from the following example how a one-dimensional apodizer can be fabricated. Three cleaned, uncoated, nearly identical 38 mm diameter GCLC cells were assembled from borosilicate glass (BK-7) substrates which has a refractive index which matches $n_{av}$, the GCLC materials. BK-7 (MIL Code 517-642) has an index of 1.509 at $\lambda = 1064$ nm. CLC1 and CLC2 have indexes of 1.5093 and 1.5099 at $\lambda = 1064$ nm. Other substrates which may be used are K3 (MIL-Code 518-590) and PK2 (MIL-Code 518-651) transparent glass. For each cell, the gap thickness between was set at 13 μm with Mylar ® foil spacers. Three spacers (foils) 120° apart are located near the edges of the substrates to form the cell. After filling and shearing, the cell can be sealed with an epoxy lead around the edge of the cell or with a gasket. However, sealing may be unnecessary because the CLC materials are quite viscous. The substrate surfaces on opposite sides of the gap are flat and plane. Absence of wedge is apparent from white light interference fringes which are visible under room illumination and should be widely spaced to show the planar nature of substrate surfaces. Filling is preferably by capillary action at 60° C., above the isotropic transition temperature of nematic E7, with two different right-handed CLC blends, each containing a different amount of the chiral additive CB15, from opposite sides of the cell. Beads of CLC1 and CLC2 are injected one at a time with syringes having filters (0.45 micron pore size) to final filter any residual particles, under a laminar flow (class 100) hood. Care is taken to avoid bubbles. Enough CLC2 is injected to cover a larger area of the gap than is covered by CLC1 as shown in FIG. 8. CLC1 had 21.36 wt. % of E7 and 78.64 wt. % of CB15. CLC2 had 26.48 wt. % of E7 and 73.52 wt. % of CB15. CLC1 was tuned by compound blending to exhibit a selective reflection peak at $\lambda_o = 1064$ nm at 22° C. CLC2 was tuned to provide a selective reflection peak at $\lambda_o = 820$ nm at 22° C. A near Grandjean structure was produced by the conventional method of shearing. FIG. 5 gives reflection spectra in the form of optical density for each CLC mixture in the visible and near infrared at 22° C. These spectral scans were taken with unpolarized optical radiation in a spectrophotometer (Perkin-Elmer Lambda-9). As mentioned earlier, the side lobes (or ripples) do not appear in spectra under conditions of weak anchoring, due to the nonuniformities in helix wave number of the molecules in the bulk. The slight tilt of the flat top region and the asymmetric selective reflection peak shapes in these scans come from a slight tilt in the Grandjean structure induced by inner-substrate surface effects. The degree of selective reflection, as indicated by the magnitude of the change in optical density, $\Delta O.D.$, from the base line, is equal to about 0.29, which shows good alignment. (The theoretical limiting value is equal to log 2 = 0.3.)

The experimental set-up used to measure apodizer transmission profiles is shown in FIG. 6(a). The output of a diode-pumped Nd:YAG laser (Amoco Micro Laser@1064 nm) is converted to right circularly polarized light, collimated and focussed onto a GCLC cell (spot size; approximately 500 um). The cell is scanned by passing it though the beam on a translation stage. Transmitted light intensity is measured using a photodiode detector (United Detector Technologies, UDT-10). FIG. 6(b) shows the transmission profiles of three GCLC cells with different annealing times taken at T=22° C. The size of the interface or overlap region is determined and can be controlled by the length of time during which the filled device is annealed (See FIG. 6(b)) at a temperature above the isotropic phase transition temperature of the mixtures (e.g., 90° C.). This keeps fluid viscosity low, and permits in-situ blending to occur in the overlap region. The transmission profiles become a lower order of super-Gaussian longer annealing times.

Figure 9:
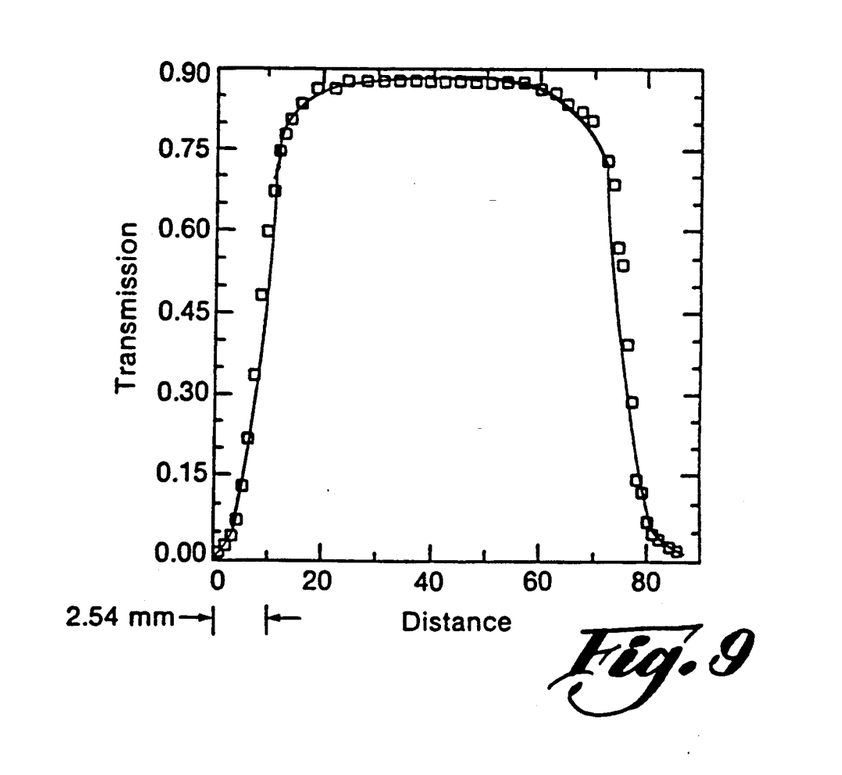
FIG. 9 is a transmission profile of the one dimensional apodizer shown in FIGS. 7 & 8, where the two GCLC elements thereof were annealed in the isotropic phase for 1 and 2 hrs., respectively.

The concept of controlled fluid blending to create a linear optical gradient can be exploited to make a one dimensional beam apodizer as shown in FIGS. 7 and 8. This device is constructed by taking two nearly identical GCLC cells whose fabrication was described above, and overlaying them with CLC1 and CLC2 in converse order, as shown in FIGS. 7 and 8. In FIG. 8 the molecules of the CLC1 and CLC2 are shown as helices with different pitch. The pitch gradient is also illustrated by the varying pitch of the helices in the overlap region. In this configuration, the light is transmitted only in the region where transmission (T) occurs for both cells. In the (R) regions, light will be blocked by selective reflection. The incident and output beam profiles are shown at 13 and 15 in FIG. 7, respectively. A transmission profile across one such apodizer is shown in FIG. 9. The clear aperture is effectively one dimensional. The clear aperture of the device can be adjusted by mechanically sliding the two GCLC elements relative to each other. The external surfaces of the substrates are preferably anti-reflective (AR) coated. The cells can be in juxtaposition. AR coating of the surfaces of the cells (23 and 25, FIG. 8) can be eliminated if the cells are in an isotropic liquid which is matched to the refractive index of the substrates. Such a liquid enables the cells to be shifted (vertically in FIG. 8) to change the width of the clear aperture.

Figure 10:
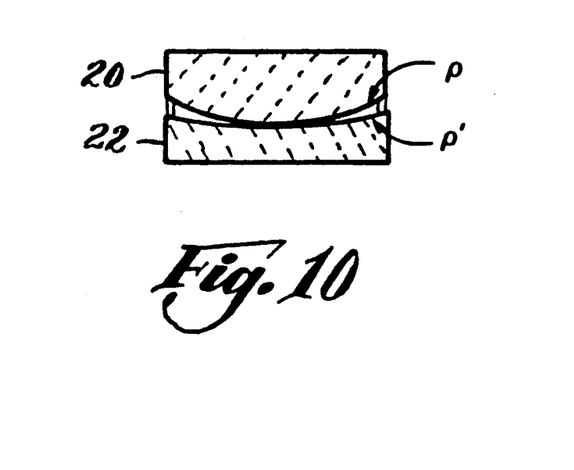
FIG. 10 is a schematic diagram showing an elevational cross-section of a 1064 nm CLC circular (two dimensional) beam apodizer made from plano-concave/convex lenses ($\rho = 1033.4$ and $\rho' = 1197.5$) and filled with a homogeneous fluid (mixture of E7 and CB15). The schematic diagram indicates the assembly orientation and the resulting relationship for fluid gap L, as a function of radial dimension r.
Figure 11:
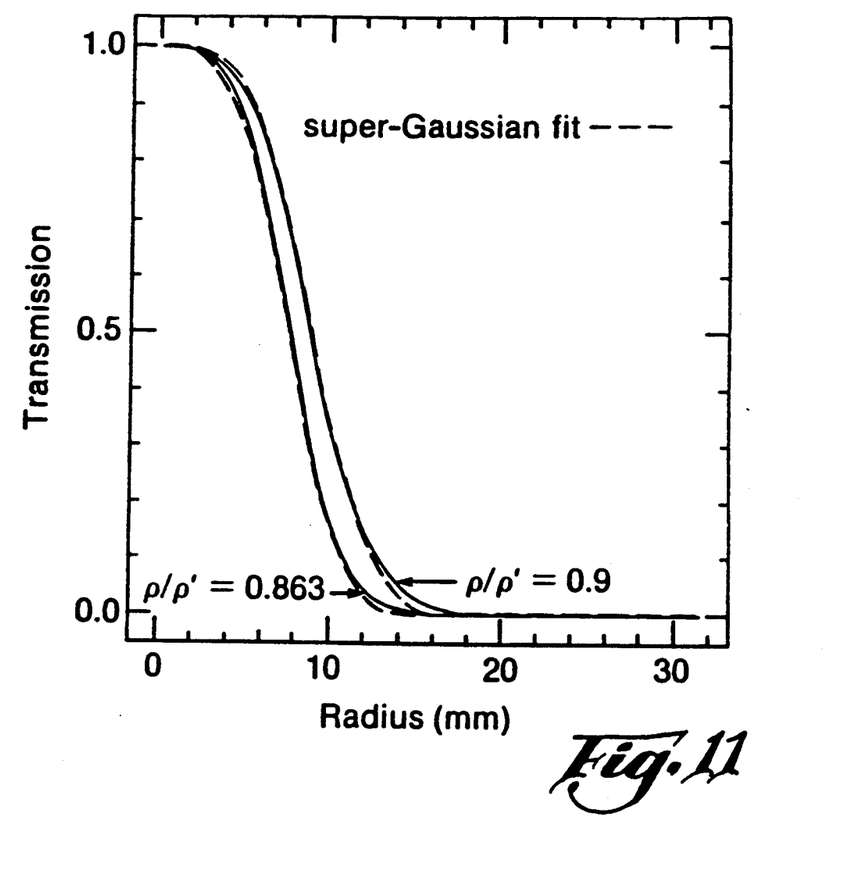
FIG. 11 are curves showing calculated edge transmission profiles for two CLC beam apodizers of the design illustrated in FIG. 10 with $\rho/\rho' = 0.863$ and $\rho/\rho' = 0.9$ [two solid lines]. The dash lines represent super-Gausian fits for each apodizer.
Figure 12:
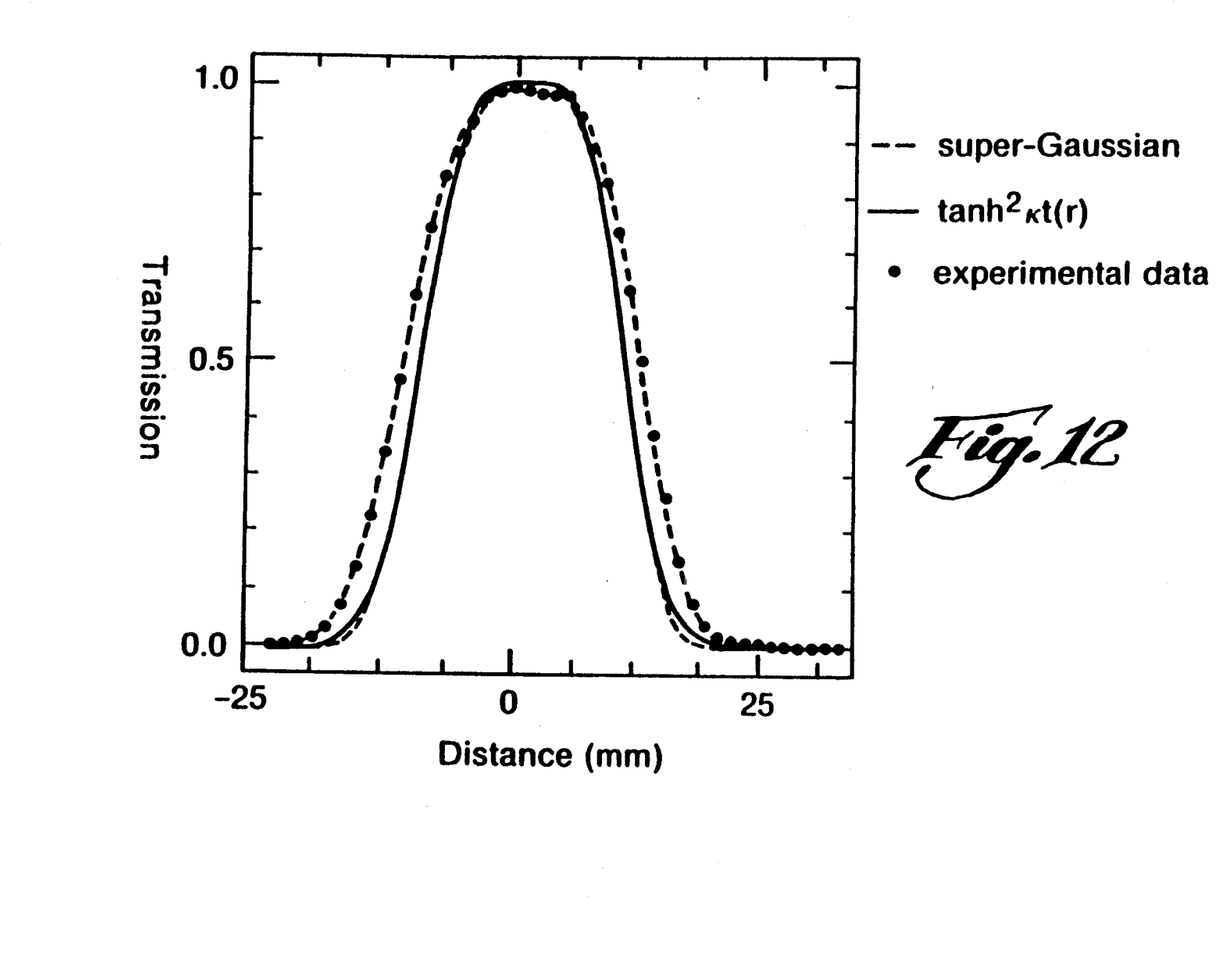
FIG. 12 is a curve showing the transmission profile at $\lambda = 1064$ nm, for the circular CLC apodizer shown in FIG. 10. The solid line is the calculated transmission profile for an ideal case, the circles are the experimental results, and the dotted lines represent the best super-Gaussian fit to the data (N = 3.51).

Referring to FIGS. 10 to 12, the fabrication of circular (two dimensional) beam apodizers of large clear aperture will become more apparent. Geometrical constraints to liquid crystal apodizer construction using previous designs (see reference 12 and the Jacobs et al. patent) makes scale-up to apertures greater than 8 mm difficult. These difficulties are eliminated by the apodizer of FIG. 10 which consists of a single, homogeneous CLC fluid between a plano-convex lens 20 with radius of curvature, $\rho$, and a plano-concave lens 22 with radius of curvature, $\rho'$. The two substrates have slightly different inner radii of curvature. The gap thickness varies such that at least 10-20 pitch lengths are accomodated at the outer perimeter. Foil spacers are used to set the gap at the perimeter. Radial symmetry of the two substrates can be checked by observing symmetrical white light, ring interference fringes which are circular in shape. Index matching between fluid and substrate lens elements is important to remove focusing. This requires that the average refractive index of the substrates should be $n_{av}$ of the CLC fluid. (See reference 12). The gap thickness between the two substrates is given by $$L(r) = \frac{r^2}{2\rho} \left[ 1 - \frac{\rho}{\rho'} \right] \quad (5)$$

The transmission profiles for $\rho/\rho'=0.863$ and $\rho/\rho'=0.9$ with $\rho=1033.4$ mm are shown in FIG. 11 as two solid lines. As $\rho/\rho'$ increases, that is, as the radii of curvature for the two substrates approach each other, the clear aperture of the apodizer increases. In this figure, the dotted lines represent a super-Gaussian fit to the transmission profiles. Both fits shown that the order of super-Gaussian is N=3.51. As long as the CLC fluid thickness is varied according to Eq. (5), the order of apodizer is invariant and equal to N=3.51 for example illustrated in FIG. 11.

By way of example of an embodiment of the device shown in FIG. 10, two 50.8 mm diameter substrates with $\rho=1033.4$ mm and $\rho'=1197.5$ mm were obtained and assembled into a cell using the curved surfaces as inner walls. The air gap was filled by capillary action at 60° C. with a homogeneous mixture of E7 and CB15 tuned to 1064 nm. The percent by weight of E7 and CB15 may be the same as for CLC1 given above. The measured (circles) transmission for the device at 22° C. and calculated (solid line) profiles as a function of radius are shown in FIG. 12. Super-Gaussian fits to both curves (dashed lines) give N=3.51 ($r_o=8.5$ mm) for the theoretical data and N=3.52 ($r_o=9.9$ mm) for the experimental data. Local misalignment of molecules in the CLC can cause the coupling coefficient to be lower than the theoretical value, explaining the above discrepancy. In general, a super-Gaussian apodizer of order greater than 3.51 is required in high power laser applications to maximize output energy. This cannot be achieved with the simple, single fluid concept demonstrated above, because the order N of the super-Gaussian cannot be varied. The addition of a gradient index effect, however, permits orders greater than 3.51 to be constructed.

Figure 13:
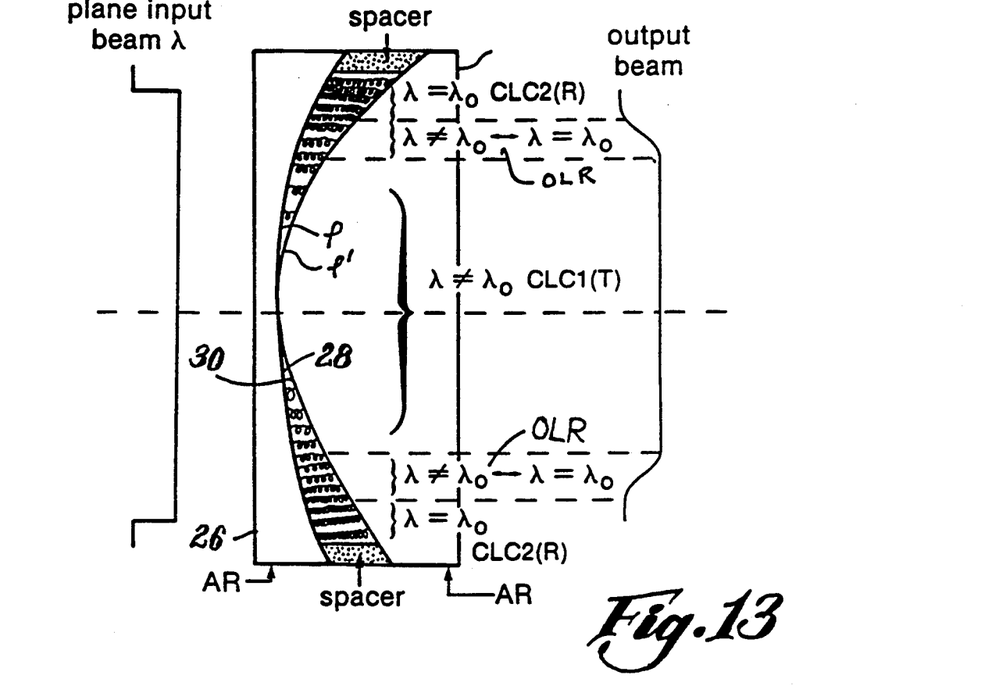
FIG. 13 is a schematic diagram showing an elevational cross-section of a 1064 nm circular GCLC beam apodizer using a mixture of CB15 in ZLI1167, (tuned to 910 nm) used as CLC1, and a mixture of CB15 in E7 (tuned to 1064 nm) used as CLC2.

A gradient index circular (two dimensional) apodizer provided in accordance with the invention will become more apparent from FIGS. 13-16, wherein not only a variation in thickness of the CLC fluid but also a pitch gradient is used. With the combination thickness and pitch gradient, circular apodizers provide a wider range of profiles, including super-Gaussian, than in the case of variable thickness above as in FIG. 10. In FIG. 13, where helices of different pitch illustrate different CLC materials, CLC1 has high transmission (T) and CLC2 has high reflection (R) at the design wavelength. The fluid-like properties of CLCs allow them to mix together and form a pitch gradient overlap region where the reflectivity changes from 0 to 1 outward radially from the center of the device, as shown by the variation in pitch of the helixes across the region. Good circular symmetry is achieved by using slightly different radii of curvature for the supporting substrates so that CLC1 is drawn into the narrow gap area in the center by radial capillary action.

By way of example, two 50.8 mm diameter substrates 24 and 26 with $\rho=1033.4$ mm and $\rho'=1197.5$ mm were assembled into a cell. Spacers 120° apart defined the gap thickness at the periphery. Interference fringes can be observed to check radial symmetry as discussed above. Mixtures of ZLI167 (21.18 Wt. %). and CB15 (78,82 Wt. %) (isotropic at 90° C., tubed to 910 nm), and E7

(21.36 Wt. %) and CB15 (78.82 Wt. %) (isotropic at 60° C., tuned to 1064 nm) were used as CLC1 and CLC2, respectively (these materials are available from EM in Hawthorne, N.J., U.S.A.). The curved surfaces 28 and 30 act as the inner cell walls and the gap thickness at the inner edge of the CLC2 band is sufficient to give high reflection.

In fabricating the device of FIG. 13, first CLC1 was filled by capillary action at 90° C. until it assumed a good circular symmetry at the center of the cell. The cell was then cooled to 45° C. and CLC2 was loaded in very slowly, so as not to initiate mixing. CLC1 tended to resist deformation because of its increased viscosity at the lower temperature. Once the filling of CLC2 was done, the temperature was increased up to 90° C. for a one hour anneal in the isotropic phase of both blends. The element was then cooled down to room temperature and sheared to get good alignment.

Figure 14:
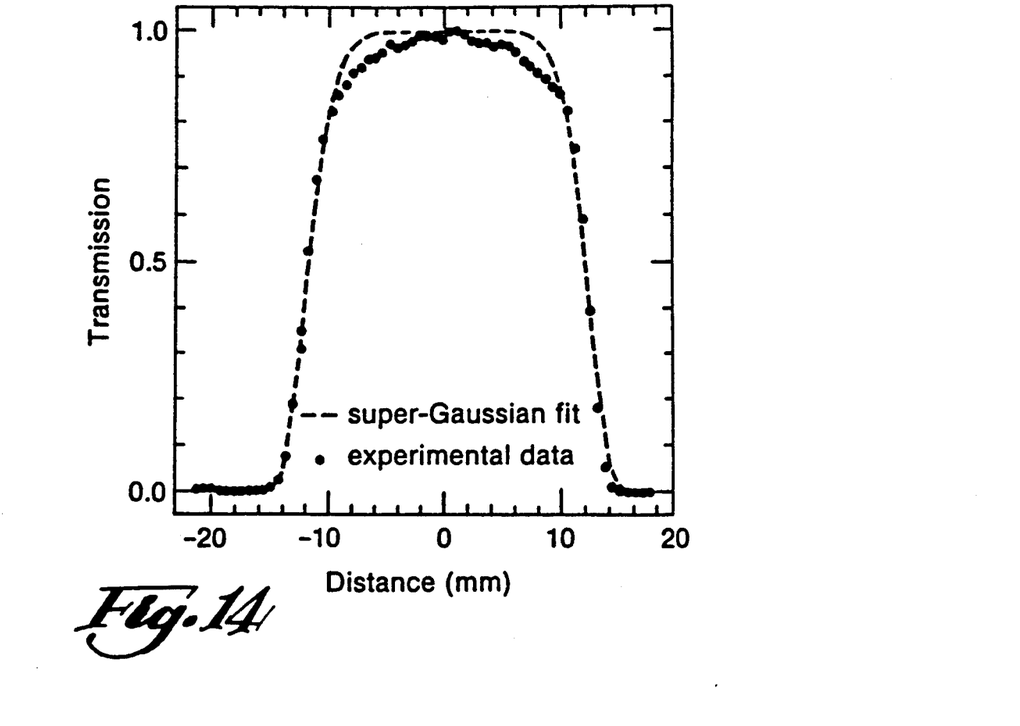
FIG. 14 is a curve showing the transmission profile of the GCLC apodizer of FIG. 13 at $\lambda = 1064$ nm. The circles are the experimental results and the dotted lines represent the best super-Gaussian fit to the data (N = 8.3, $r_o = 12.4$ m). The annealing period was 1 hr.

Experimental data (circles) taken at 22° C. and a super-Gaussian fit (dashed line) are shown in FIG. 14. This apodizer profile is seen to match as super-Gaussian of order $N=8.3$ with $r_o=12.4$ mm. The deviation from ideal performance in the central flat-top region where high transmittance is required, is a result of residual reflectance at 1064 nm from the wing of the CLC1 reflection band centered at 910 nm. It can be eliminated by preparing a CLC1 blend which has a selective reflection peak at a shorter wavelength than 910 nm. The slope at the edge of the apodizer can be changed by varying the length of time at which the filled device is thermally annealed at a constant temperature above the isotropic phase transition temperatures of the mixtures, where the viscosities are low. A slight assymmetry to the apodizer profile seen in FIG. 14 is a result of a wedge inadvertently introduced by epoxy in a sealing operation.

Figure 16:
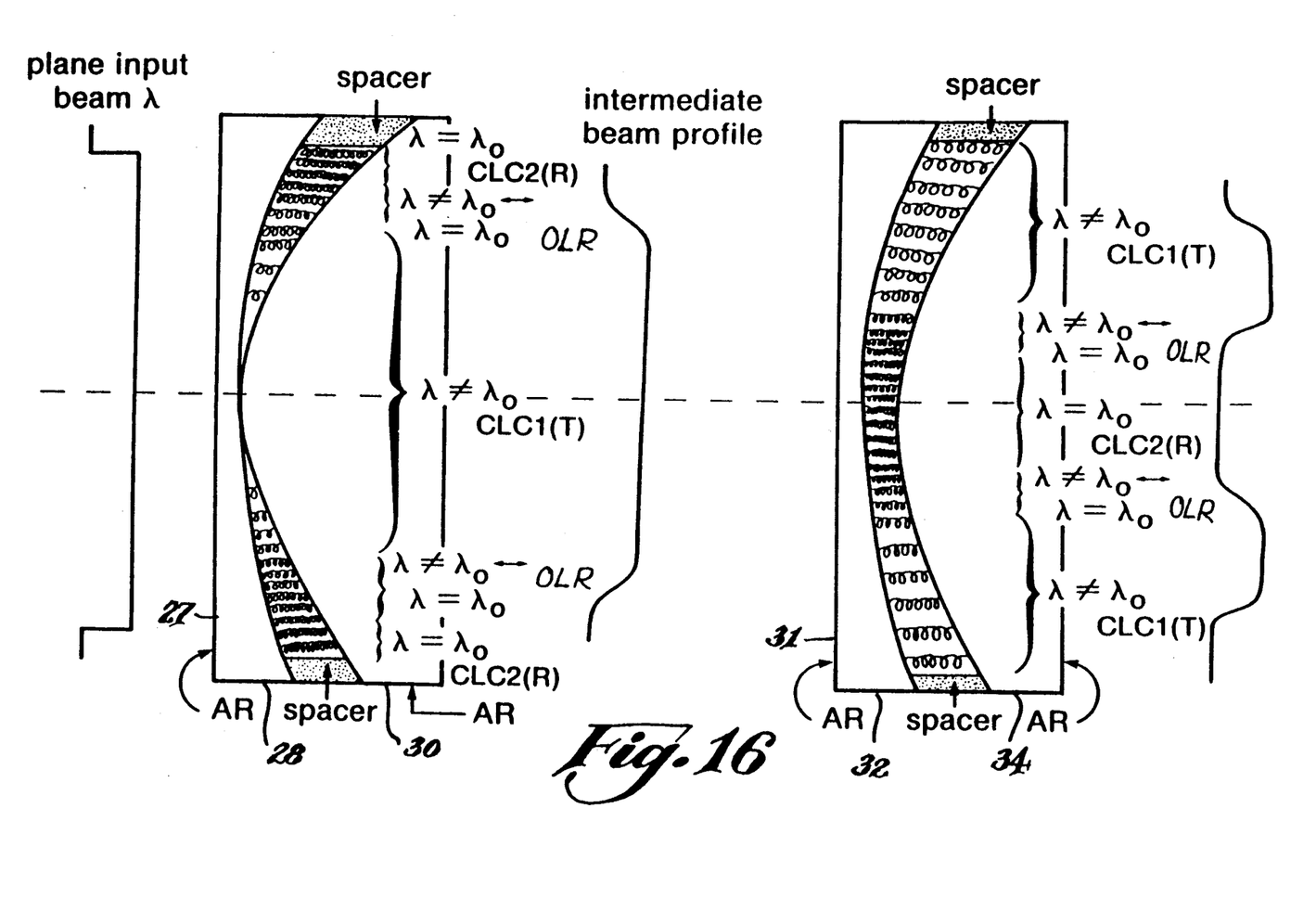
FIG. 16 is a schematic diagram of an annular beam apodizer using two circular elements of the type shown in FIG. 13 for obtaining a ring shaped (in cross-section) beam.

In order to obtain an annular or ring profile a pair of devices 27 and 31 can be arranged in tandem as shown in FIG. 16 or stacked in juxtaposition. The CLC1 and CLC2 mixtures are in converse order in devices 27 and 31, as shown.

Figure 15:
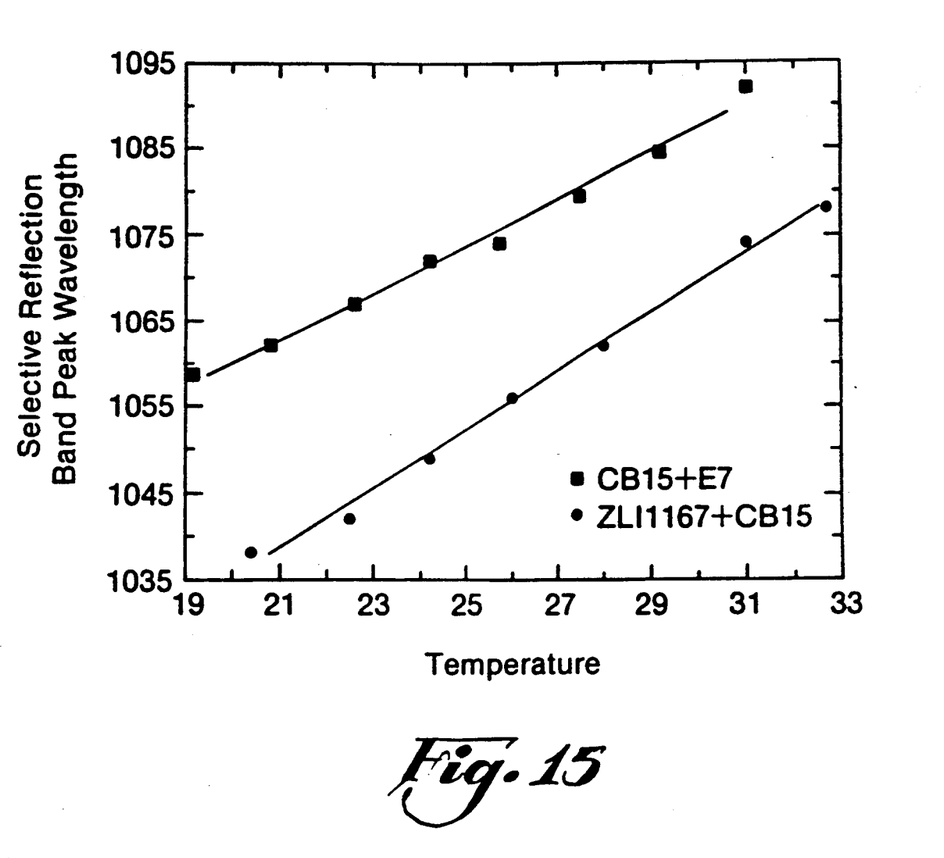
FIG. 15 are curves showing the change in selective reflection peak wavelength as a function of temperature for ZLI1167 + CB15 (square) and E7 + CB15 mixtures (circles).

Temperature changes can cause wavelength shifts to the features of liquid crystal devices. Temperature dependence of the selective reflection peak wavelengths for the two CLC's used to make the graded index circular apodizer are shown in FIG. 15. In the temperature range of 20° C. to 30° C., the selective reflection peak wavelength is shifted 2.8 nm/°C. for the mixture of E7 and CB15 and 2 nm/°C. for the mixture of ZLI1167 and CB15. New chiral dopants have recently been described which can be employed to reduce temperature sensitivity of CLC mixtures. See reference (17).

Polymeric liquid crystals offer unique advantages such as temperature insensitivity and ruggedness. Liquid crystal polymer systems which can be used are polysiloxane and polyglutamates having different side groups. (See reference 18).

From the foregoing description, it will be apparent that improved GCLC devices and particularly the design, fabrication and characterization of laser beam apodizers based upon gradient-index optical effects in liquid crystals have been described. For a one dimensional apodizer design, the clear aperture was shown to be variable by means of sliding two device elements over each other. A circular apodizer, in which the thickness variation of CLC fluid is defined by two substrates with different inner surface radii of curvature profile has a super-Gaussian order of $N=3.51$. The ability to vary N in this design and the ability to obtain desired, super-Gaussian profiles by using the mixing property of liquid crystals to create a gradient index optical effect was also described. Variations and modifications in the herein described devices within the scope of the invention will undoubtedly become apparent to those skilled the art. Accordingly, the foregoing description should be taken as illustrative and not in a limiting sense.

REFERENCES

1. V. R. Costich and B. C. Johnson, "Apertures to shape high power beams," Laser Focus, 10(9), 43–46 (1974).
2. A. Penzkofer and W. Frohlich, "Apodizing of intense laser beams with saturable dyes," Opt. Commun. 28(2), 197–201 (1979).
3. Y. Asahara and T. Isumitani, "Process of producing soft aperture filter; heat treatment of glass composed of oxides of sodium, silicon, zinc, aluminum, tin and-/or arsenic in a silver salt bath," U.S. Pat. No. 4,108,621 (Aug. 22, 1978).
4. G. Dubé, "Progress in glass components for neodymium lasers," in *Advanced Laser Technology and Applications*, L. Esterowitz, ed., Proc. Soc. Photo-Opt. Instrum. Eng. 335, 10–14 (1982).
5. V. I. Kryzhanovskii, B. M. Sedov, V. A. Serebryakov, A. D. Tsvetkov, and V. E. Yashin, "Formation of the spatial structure of radiation in solid-state laser systems by apodizing and hard apertures." Sov. J. Quantum Electron. 13(2), 194–198 (1983).
6. A. J. Campillo, B. Carpenter, B. E. Newnam, and S. L. Shapiro, "Soft apertures for reducing damage in high-power laser-amplifier system," Opt. Commun. 10(4), 313–315 (1974).
7. E. W. S. Hee, "Fabrication of apodized apertures for laser beam attenuation," Opt. Laser Technol. 7(2), 75–79 (1975).
8. S. B. Arifzhanov, R. A. Ganeev, A. A. Gulamov, V. I. Redkorechev, and T. Usmanov, "Formation of a beam of high optical quality in a multistage neodymium laser," Sov. J. Quantum Electron. 11(6), 745–749 (1981).
9. G. Dubé, "Total internal reflection apodizers," Opt. Commun. 12(3), 344–347 (1974).
10. J. C. Diels, "Apodized aperture using frustrated total reflection," Appl. Opt. 14(12), 2810–2811 (1975).
11. B. J. Feldmand and S. J. Gitomer, "Annular lens soft aperture for high power laser systems," Appl. Opt. 16(6), 1484–1486 (1977).
12. S. D. Jacobs, K. A. Cerqua, K. L. Marshall, A. Schmid, M. J. Guardalben, and K. J. Skerrett, "Liquid-crystal laser optics: design, fabrication, and performance," J. Opt. Soc. Am. B 5(9), 1962–1979 (1988).
13. J. L. Fergason, "Cholesteric structure I. optical properties," in *Liquid Crystals: Proceedings of the International Conference on Liquid Crystals*, at Kent State University, 16–20 Aug. 1965, G. H. Brown, G. J. Dienes, and M. M. Labes, eds., pp. 89–103, Gordon and Breach, New York (1967).
14. J. C. Lee, J. H. Kelly, D. L. Smith, and S. D. Jacobs, "Gain Squaring in a Cr:Nd:GSGG Active-Mirror Amplifier Using a Cholerteric Liquid Crystal Mirror," IEEE J. Quantum Electron. 24(11), 2238–2242 (1988).
15. P. D. deGennes, *The Physics of Liquid Crystals*, pp. 264–266, Oxford, Claredon (1974).
16. Ibid, pp. 240–241.

17. F. Leenhouts, S. Kelly, and A. Villiger, "Compensation of temperature dependence of the optical characteristics of twisted nematic liquid-crystal displays using a single chiral dopant," Appl. Phys. Lett. 54(8), 696–697 (1989).
18. M. L. Tsai, S. H. Chen, and S. D. Jacobs, "Optical Notch Filter Using Thermotropic Liquid Crystal Polymers", *Appl. Phys. Lett.* p 54(24), 2395–2397 (1988). See also M. Guardalben, A. Bevin, K. Marshall, and A. Schmid, "1053-nm high-field effect in monomeric and polymeric conjugated systems," Proceedings, 20th Annual Symposium on Optical Materials, Boulder, Colo., 26 Oct. 1988, in press.
19. H. Kelker in "Molecular Crystals and Liquid Crystals," Vol. 15, pps. 347–361; Gordon % Breach Science Publishers, Great Britain, 1972.

We claim:

1. Apparatus for shaping the profile of an optical beam of given wavelength which is directed along a path, which comprises at least one liquid crystal device intercepting said beam, said device having a first and a second substrate respectively having first and second surfaces opposed to each other, a liquid crystal material between said surfaces and having a chirality providing a structure of molecules of a given pitch $P_0$ so as to provide a selective reflection band having a peak wavelength where $\lambda_0$, the peak wavelength in said band being essentially equal to said given wavelength and equal to the product of $P_0$ and $n_{av}$, the average of the extraordinary and ordinary indexes of refraction of said material at $\lambda_0$ and measured at temperatures at which said apparatus is operating, and said first and second surfaces defining weak anchoring sites for said molecules.

2. The apparatus according to claim 1 wherein said surfaces have a gap therebetween defining a distance between said surfaces which varies in a direction transverse to said path.

3. The apparatus according to claim 2 wherein 2r is the aperture of said device said variation in thickness is provided by said surfaces first surface having a radius of curvature $\rho$ and said second surface having a radius of curvature $\rho'$ about a point along said path such that said gap is annular and has a thickness, L as a function of r, L(r) which is equal to:

$$L(r) = \frac{r^2}{2\rho}\left[1 - \frac{\rho}{\rho'}\right]$$

4. The apparatus according to claim 1 wherein said liquid crystal material is a first material and further comprising a second liquid crystal material also having chirality providing a pitch different from said given pitch so as to provide a selective reflection band having a peak wavelength different from $\lambda_o$, said second material being disposed between said substrates adjacent said first material to define a region with a pitch gradient presenting a gradient index of refraction to said beam.

5. The apparatus according to claim 1 wherein said surfaces are planar and parallel, and separated by a gap of thickness at least equal to a plurality of times the pitch of the one of said materials having the longer pitch.

6. The apparatus according to claim 4 further comprising a second device disposed in tandem with said first device and respectively defining a first and a second of said regions having said pitch gradient, which regions are displaced laterally from each other.

7. The apparatus according to claim 6 wherein said first and second devices each contain said first and second materials, said first material and said second material in said first device being disposed in converse order to said first and second material in said second device.

8. The apparatus according to claim 7 wherein said second material in said first device and in said second device are transmissive at said given wavelength and are disposed successively in the path of said beam.

9. The apparatus according to claim 4 wherein said region is disposed linearly across the path of said beam.

10. The apparatus according to claim 8 wherein said first and second regions extend across the path of said beam.

11. The apparatus according to claim 4 wherein said one of said first and second materials is disposed annularly around the other of said first and second materials and said gradient index region has an annular configuration.

12. The apparatus according to claim 11 further comprising a second device having one of said first materials and second materials disposed annularly about the other of said first and second material to define a second annular pitch-gradient index region, said annular region having inner peripheries of different dimensions across the inner peripheries thereof, said devices being disposed in tandem along the path of said beam.

13. The apparatus according to claim 12 wherein said first and second materials are disposed in converse order in said first and second devices, respectively.

14. The apparatus according to claim 4 wherein said first and second materials each consist essentially of a mixture of a first and second material of different chirality.

15. The apparatus according to claim 14 wherein said first and second materials are a nematic liquid crystal and a chiral additive.

16. The apparatus according to claim 14 wherein said first and second materials are liquid crystal polymers.

17. The apparatus according to claim 16 wherein said liquid crystal polymers are polysiloxane, polyacrylate or polyglutamate co-polymers.

18. The apparatus according to claim 1 wherein said weak anchoring sites are provided by said surfaces being smooth and essentially free of grooves.

19. The method of fabricating a device for shaping the profile of a laser beam which comprises the steps of preparing mixtures of liquid crystal materials of different chirality to provide first and second mixtures each having different pitch, containing said mixtures in a gap between surfaces of substrates so that a region is formed having a gradient pitch.

20. The method according to claim 19 wherein said mixture has an isotropic further comprising annealing said device above the isotropic temperature of the mixtures to control the width of said region.

21. The method according to claim 19 further comprising the step of preparing surfaces of said substrates which form said gap, of sufficient smoothness to form only weak anchoring sites for said materials prior to introducing said mixtures.

22. The method according to claim 20 further comprising the step of shearing said materials by reciprocating said substrates with respect to each other.

23. The method according to claim 19 further comprises the step of locating a plurality of said devices in tandem with said regions in offset relationship.

* * * * *